(12) United States Patent
Williams

(10) Patent No.: US 10,329,095 B1
(45) Date of Patent: Jun. 25, 2019

(54) CABLE CONNECTOR FOR TUBULAR CONVEYOR SYSTEMS

(71) Applicant: INTRACO, INC., Oskaloosa, IA (US)

(72) Inventor: Millard M. Williams, Oskaloosa, IA (US)

(73) Assignee: INTRACO, INC., Oskaloosa, IA (US)

( * ) Notice: Subject to any disclaimer, the term of this patent is extended or adjusted under 35 U.S.C. 154(b) by 0 days.

(21) Appl. No.: 16/036,065

(22) Filed: Jul. 16, 2018

(51) Int. Cl.
*B65G 19/14* (2006.01)
*F16G 11/06* (2006.01)
*B65G 23/44* (2006.01)

(52) U.S. Cl.
CPC ............. *B65G 19/14* (2013.01); *B65G 23/44* (2013.01); *F16G 11/06* (2013.01); *F16B 2200/50* (2018.08)

(58) Field of Classification Search
CPC ........ B65G 19/14; B65G 19/16; B65G 19/26; B65G 23/44; F16G 11/06; F16B 2200/50
USPC ......................................................... 198/732
See application file for complete search history.

(56) References Cited

U.S. PATENT DOCUMENTS

| | | | | |
|---|---|---|---|---|
| 2,391,700 A | * | 12/1945 | Hapman | B65G 19/16 198/629 |
| 2,756,866 A | * | 7/1956 | Wilde, Jr. | B65G 19/14 198/629 |
| 3,250,379 A | * | 5/1966 | Leach | B65G 19/14 198/732 |
| 3,530,548 A | * | 9/1970 | Gearin | F16G 11/10 24/573.11 |
| 3,586,155 A | | 6/1971 | Turrentine et al. | |
| 3,905,473 A | | 9/1975 | Jones | |
| 3,920,340 A | | 11/1975 | Jones | |
| 4,071,136 A | | 1/1978 | Jones | |
| 4,071,163 A | | 1/1978 | Martin | |
| 4,395,973 A | | 8/1983 | Hall | |
| 5,509,750 A | | 4/1996 | Boike | |
| 6,267,227 B1 | | 7/2001 | McGown | |
| 6,510,760 B2 | | 1/2003 | Matsou | |
| 6,837,126 B2 | | 1/2005 | Matsou | |
| 7,267,218 B1 | | 9/2007 | Van Zee | |
| 7,411,130 B2 | | 8/2008 | Dall | |
| 8,215,886 B2 | | 7/2012 | Campbell et al. | |
| 8,863,940 B2 | | 10/2014 | Sterner | |
| 9,745,135 B1 | | 8/2017 | Nicholson | |
| 2012/0279829 A1 | * | 11/2012 | Sterner | B65G 19/24 198/747 |
| 2015/0136569 A1 | * | 5/2015 | Kamps | B65G 19/14 198/716 |
| 2015/0251852 A1 | * | 9/2015 | Nicholson | B65G 19/28 198/733 |

* cited by examiner

*Primary Examiner* — Mark A Deuble

(57) ABSTRACT

A conveyor system of a type having a flexible circuitous cable with discs attached thereto for conveying material through a circuitous tube, the system including a cable connector for attaching the ends of the cable together, the connector being designed to reduce cable flexing at the cable connector when the cable is going around a turn, for the purpose of increasing the life of the cable.

10 Claims, 4 Drawing Sheets

CABLE CONNECTOR FOR TUBULAR CONVEYOR SYSTEMS

TECHNICAL FIELD

This invention relates generally to an improved joint for attaching the ends of a cable with discs thereon for use in a circuitous tube conveyor system or the like, such as a cable or chain conveyor system.

BACKGROUND

Cable or chain conveyor systems of a type including a circuitous tube and a cable or chain with a plurality of discs attached thereto can be used for conveying granular or powdery materials for feeding animals or poultry, whole plant particles for food such as corn, beans or coffee, friable materials such as powders, chunks, flakes, pellets, parts, shavings, crumbles, granules, fluff, regrind and dust, food grade products such as coffee, nuts, etc. or industrial products such as ball bearings or threaded fasteners. U.S. Pat. Nos. 3,905,473, 4,071,136, 4,395,973, 7,267,218 and 8,863,940 (all incorporated herein by reference in their entirety) illustrate cable conveying systems of the general type referred to above. Systems of this type can be seen at www.cablevey.com.

When a cable segment is traveling in a straight line there is very little flexing of the cable. But at corners of a cable conveyor system, the cable flexes or bends as the discs slide through the corners. Also, the cable flexes while going around idler or drive sprockets, or at any other place in a tube that is not straight. When traveling around these sprockets or through non-straight sections of a tube, the cable flexes. This is especially a problem at a place where the ends of the cable are connected together, for example as shown by cable connectors in U.S. Pat. Nos. 3,920,340 and 7,267,218, both incorporated herein by reference. It has been empirically determined that if the cable breaks, it almost always breaks at the cable/connector junction before it breaks anywhere else. This is due to excessive bending or flexing at the cable connector.

Accordingly, there is a need for a cable connector to reduce cable flexing at the cable connector for the purpose of increasing the life of the circuitous cable with the discs attached thereto.

SUMMARY OF THE INVENTION

The present invention relates to a cable connector designed to (1) reduce cable flexing at the cable connector for the purpose of increasing the life of the circuitous cable with the discs attached thereto and (2) permit easy cable connection installation because it eliminates the need to remove a cable disc because the connector attaches to a disc and thereby essentially becomes part of the disc.

BRIEF DESCRIPTION OF THE DRAWINGS

The above needs are at least partially met through provision of the apparatus described in the following detailed description, particularly when studied in conjunction with the drawings, wherein.

Figure 1:
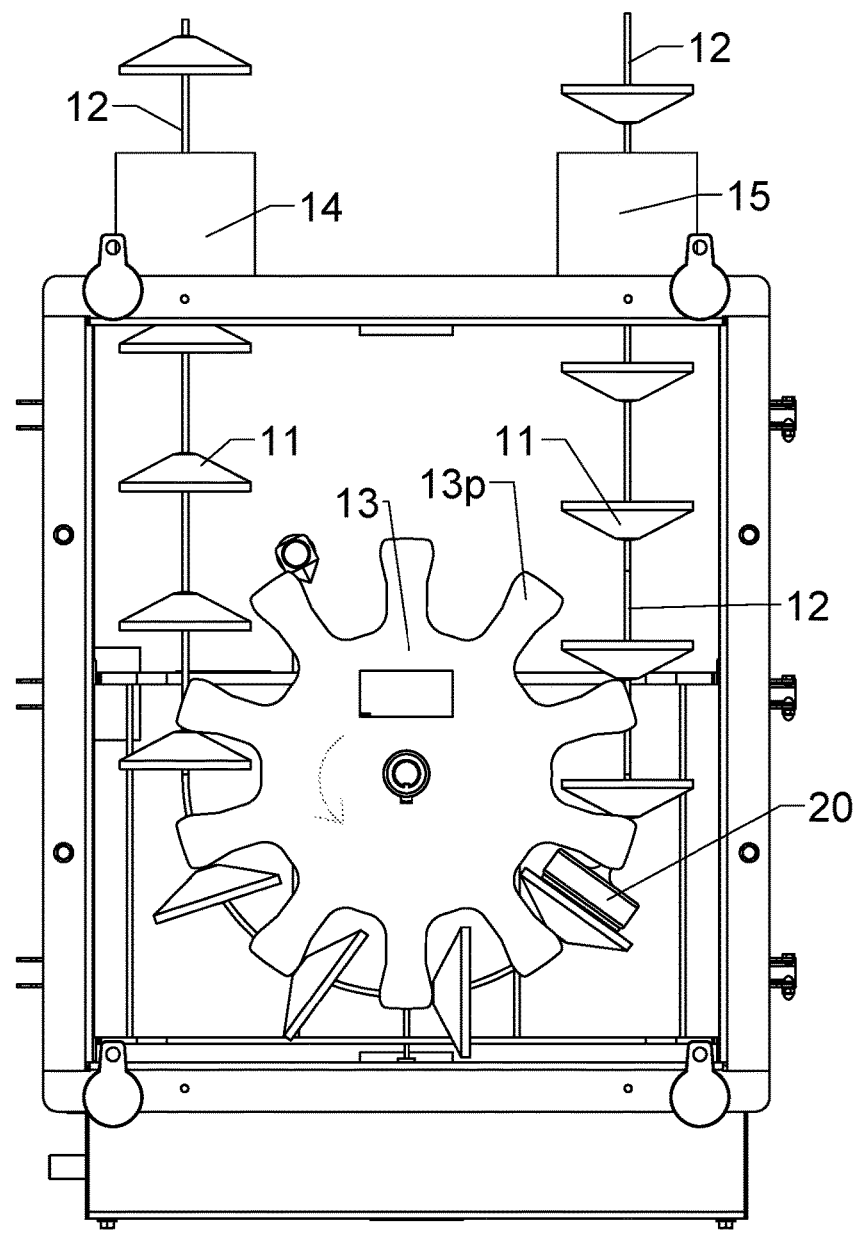
FIG. 1 shows a "turn" portion of a cable conveyor system having equidistantly spaced apart discs attached to a cable disposed around a sprocket.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-6 show a cable connector constructed in accordance with the present invention.

A preferred embodiment of the present invention is shown in FIGS. 1-6, FIG. 1 showing a "turn" portion of a cable conveyor system having equidistantly spaced apart discs 11 attached to a cable 12 disposed around a sprocket 13. When the sprocket 13 rotates in the counterclockwise direction as shown by an arrow in FIG. 1, projections 13p on the sprocket 13 push the discs 11 in a counterclockwise direction, causing the discs 11 on the left side at tube port 14 to be pulled toward the sprocket 13 and the discs 11 on the right side shown in FIG. 1 to move out through the right side tube port 15. It will be understood that the cable 12 is formed into an endless loop because the ends are connected together at cable connector 20. The sprocket 13 can be a "drive" sprocket that causes the cable 12 and discs 11 to move in a circuit through a tube, or the sprocket 13 may merely an idler sprocket for just assisting the cable 12 with discs 11 to make a turn without creating an inordinate amount of friction of the discs 11 against the tube.

U.S. Pat. No. 3,920,340 to Jones and U.S. Pat. No. 7,267,218 to Van Zee et al. show a cable connector like cable connector 20 for attaching the ends of a cable together in a cable conveyor system, so the details of that connector 20 are not shown herein.

Figure 2:
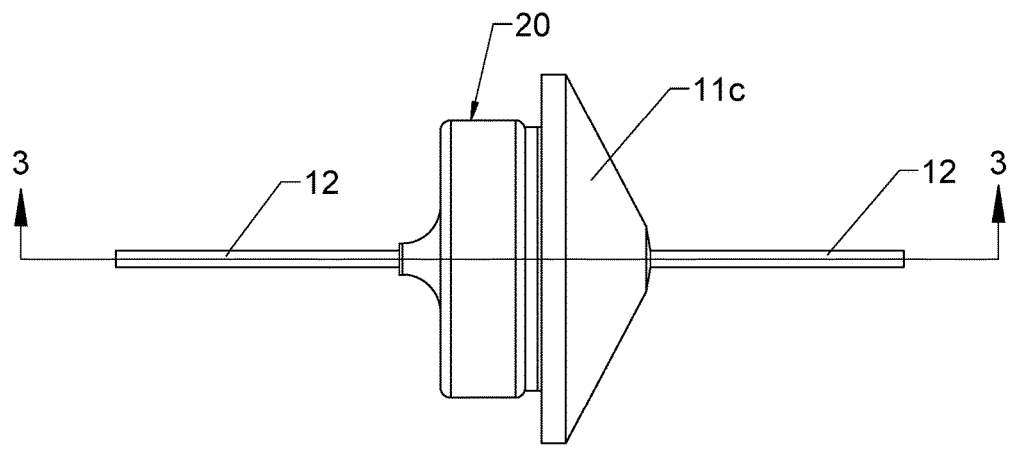
FIG. 2 is a side elevational view of a section of the cable and discs where the ends of the cable are joined together with a preferred embodiment of the cable connector of the present invention.

FIGS. 1 and 2 of U.S. Pat. No. 8,863,940 to Sterner et al. show the equivalence of discs on cables and discs on chains in a tube conveyor. Therefore, the definition of a "flexible member" as used in this document shall include, but not be limited to, a cable or a chain of the general type show in the '940 Sterner et al patent.

"Disc" as used in this document is used in a generic sense and is not limited to structure which is circular, but instead is intended to be any structure which is attached to such flexible member that is capable of pushing a material to be conveyed through a tube.

"Tube" (or tubular) also is not intended to be limited to a circular cross-sectional shape, but instead can be made of a cross sectional shape generally matching the shape of the disc so that material being conveyed in the tube will be pushed along without such material passing around the disc.

Figure 3:
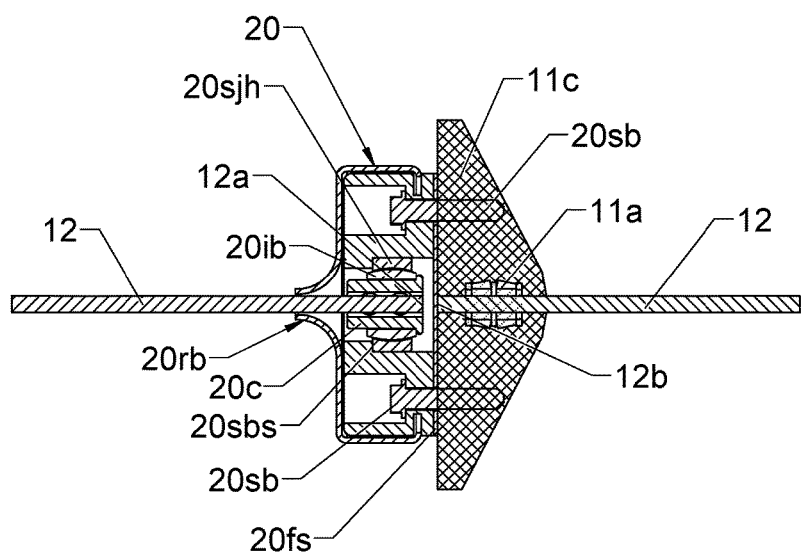
FIG. 3 is a cross-sectional view taken along lines 3-3 of FIG. 2.

FIG. 2 shows a side elevational view of a section of the disc 11c and cable 12, the ends 12a and 12b being attached together by the structure shown in the cross-sectional view shown in FIG. 3.

Figure 4:
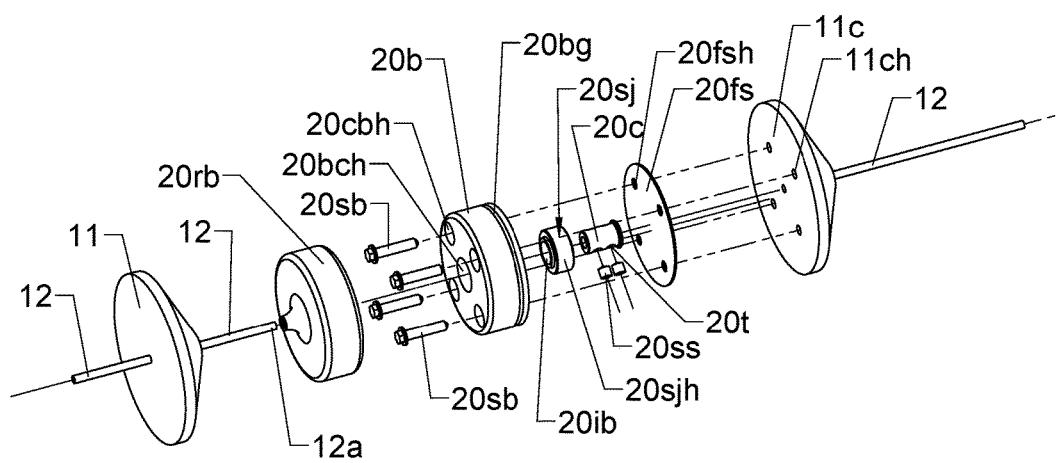
FIG. 4 is a perspective exploded view of the cable connector of the present invention in the environment in which it is to be used.

Looking now to FIGS. 3 and 4, a preferred embodiment of the cable connector 20 of the present invention is shown. The cable connector 20 is comprised of several parts. On the right side of the connector 20, the cable end 12b is shown molded inside of disc 11c in the same manner that all of the other discs 11 are attached to the cable 12. A metal barrel 11a is secured to the cable 12 and the plastic disc 11c is molded around the barrel 11a and cable 12 as disclosed in detail in U.S. Pat. No. 9,828,703 to Witting (incorporated herein by reference) so that the discs 11 are secured onto the cable 12 to prevent the discs 11 from moving with respect to the cable 12.

A cylindrical block 20b has a plurality of counter bored holes 20cbh for receiving a plurality of self-tapping screws or threaded lag bolts 20sb. The lag bolts 20sb, are sometimes called "lag screws" because they have a screw-like helical structure from the head to the tip of such lag bolts 20sb. The cylindrical block 20b can be made of plastic such as UHM-WPE, metal or other synthetic materials.

Other parts of the connector 20 shown exploded in FIG. 4 and in cross-section in FIG. 3 are a connector 20c, with threaded openings 20t for receiving threaded set screws 20ss. A spherical bearing, herein called a swivel joint 20sj, has a swivel joint housing 20sjh that has a cylindrical shape on the outside thereof and a partially spherical shape on the inside thereof to receive an inner bearing 20ib that has a partially spherical shape on the outside thereof for mating with the inner spherical shape on swivel joint housing 20sjh. An inside opening in the inner bearing 20ib is of a size to allow the end 12a of the cable 12 to be received therein as shown in FIGS. 3 and 4. A rubber boot 20rb is also part of the preferred embodiment of the cable connector 20 shown in FIGS. 3 and 4.

To attach the ends of the cable 12a and 12b using the cable connector 20, the parts would be lined up essentially as shown in the exploded view of FIG. 4. The cable end 12a would be pushed through a central opening in the rubber boot 20rb, through the central hole 20bch, through the hole 20ib in the swivel joint 20sj and then into the connector 20c. Once the cable end 12a is disposed in the connector 20c as shown in FIG. 3, the set screws 20ss are screwed into the threaded openings 20t and tightened against the cable end 12a.

After that, the lag bolts 20sb are screwed through foam seal holes 20fsh of seal 20fs and disc holes 11ch, which pulls all of the parts snugly together to the position shown in FIG. 3. After the lag bolts 20sb are tightened, the rubber boot 20rb is slipped over the cylindrical block 20b until the rubber boot is in the position shown in FIG. 3 with a peripheral flange thereon fitting into a groove 20bg in cylindrical block 20b. It is noted that when the lag bolts 20sb are tightened that the housing 20sjh of swivel joint 20sj (FIG. 6) is pinned against a shoulder 20sbs of hole 20bch in cylindrical block 20b so that the swivel joint 20sj is held in place while still allowing the inner portion to swivel inside of the housing 20sjh with movement of the cable 12.

Figure 5:
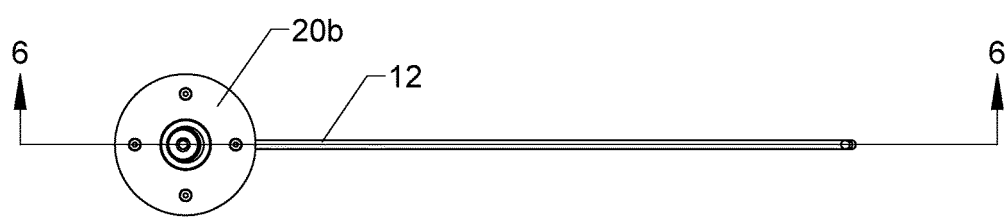
FIG. 5 is a view of the preferred embodiment of the cable connector of the present invention disconnected from the disc to which it would be attached while going around a turn, such as a 180 degree corner sweep, a drive sprocket or an idler sprocket.
Figure 6:
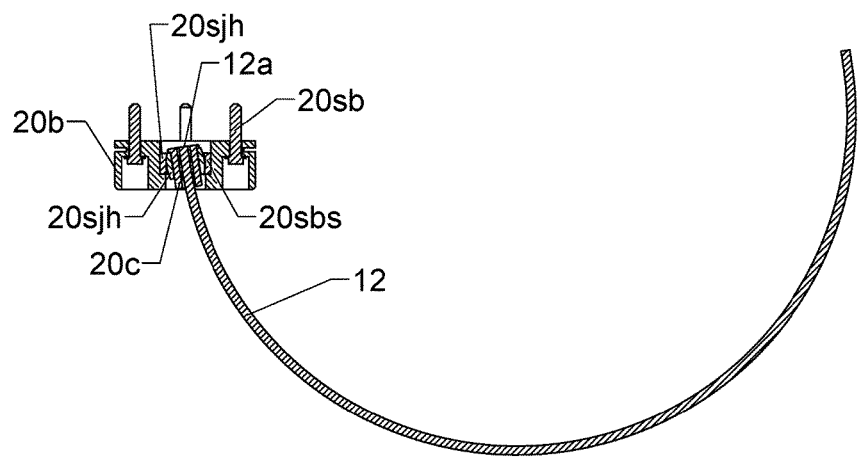
FIG. 6 is a cross-sectional view taken along lines 6-6 of FIG. 5, showing the position of the swivel joint of the present invention as it would be positioned going around a turn, such as a 180 degree corner sweep, a drive sprocket or an idler sprocket.

FIGS. 5 and 6 show how the cable connector 20 permits the cable 12 to bend in a gentle curved shape at the disc 11c instead of bending sharply at the cable connector 20c as happens in prior art cable connectors such as that shown in U.S. Pat. No. 3,920,340 to Jones.

In operation, with the spherical shape of the swivel joint 20sj, the angle of motion can be anywhere within 360 degrees. The cable 12 can be traveling horizontally then turn in any direction without flexing the cable 12 at the connector 20c. Since cables of the prior art almost always break at the cable/connector junction before the cables break anywhere else, the present invention as shown in the embodiment of FIGS. 1-6 eliminates most of the cable flexing at the cable connector 20c to thereby increase the life of the cable 12.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims. For example, the material of construction for the UHMWPE block 20b is not limited to the material disclosed.

I claim:

1. A cable conveying apparatus comprising:
    a flexible member having a plurality of discs attached thereto, the flexible conveyor member and plurality of discs being adapted to be moved through a tube for conveying materials disposed in the tube, the flexible member having a first end and a second end;
    a cable connector for operatively attaching the first end to the second end of the flexible member for making continuous loop for movement inside of the tube;
    the cable connector comprising a swivel joint attached to the first end of the flexible member, the cable connector comprising a housing with an inner surface therein that is at least partially spherical, an inner member disposed in the housing, the inner member having an outer surface thereon which is at least partially spherical and is in engagement with the inner surface of the housing to permit the inner member to swivel with respect to the housing;
    the first end of the flexible member being operatively attached to the inner member;
    wherein the inner member has an opening therein;
    a hollow sleeve having a flange on one end thereof, the hollow sleeve being disposed in the opening of the inner member; and
    the one end of the flexible member being disposed inside of the hollow sleeve, the flexible member extending out of another end of the hollow sleeve.

2. The apparatus of claim 1 wherein the hollow sleeve has at least one threaded opening therein leading from the outside to the inside of the hollow sleeve; and
    a threaded set screw disposed in the threaded opening for securely holding the first end of the flexible member inside of the hollow sleeve.

3. The apparatus of claim 2 wherein the housing further comprising an outer portion thereof surrounding the inner and outer partially spherical surfaces.

4. The apparatus of claim 3, wherein the second end of the flexible member is attached to a terminal disc; and
   the outer portion is operatively attached to the terminal disc.

5. The apparatus of claim 4 wherein lag screws attach the outer portion of the housing to the terminal disc.

6. The apparatus of claim 5 including a boot operatively attached to the outer housing, the boot being disposed around the flexible member and around the outer housing for keeping the swivel joint clean.

7. The apparatus of claim 4 wherein the plurality of discs are substantially equally spaced from each respective adjacent disc.

8. The apparatus of claim 1 wherein the flexible member is a cable.

9. The apparatus of claim 1, wherein the housing further comprises an outer portion thereof surrounding the inner and outer partially spherical surfaces;
   wherein the second end of the flexible member is attached to a terminal disc; and
   the outer portion is operatively attached to the terminal disc.

10. The apparatus of claim 9, wherein the terminal disc is substantially identical to all of the other discs on the flexible member.

* * * * *